United States Patent [19]

Kolsun

[11] Patent Number: 5,666,724
[45] Date of Patent: Sep. 16, 1997

[54] INSTALLATION AND ASSEMBLY DEVICE AND METHOD OF USING

[75] Inventor: George J. Kolsun, Pittsburgh, Pa.

[73] Assignee: The United States of America as represented by the United States Department of Energy, Washington, D.C.

[21] Appl. No.: 433,286

[22] Filed: May 3, 1995

[51] Int. Cl.$^6$ .............................. B23P 11/00; B23P 19/00
[52] U.S. Cl. .............. 29/888.02; 29/23.51; 29/888.025; 29/464; 29/281.5; 29/407.05; 29/407.1
[58] Field of Search .................... 29/23.51, 889, 29/889.2, 889.22, 888.02, 888.025, 464, 423, 281.5, 407.05, 407.1; 415/213.1, 214.1, 208.1, 211.1, 173.2, 173.1

[56] References Cited

U.S. PATENT DOCUMENTS

| | | | |
|---|---|---|---|
| 2,862,453 | 12/1958 | Nagle . | |
| 2,978,988 | 4/1961 | McAlpine . | |
| 3,086,473 | 4/1963 | Miloradovitch . | |
| 3,409,970 | 11/1968 | DePietra . | |
| 3,628,884 | 12/1971 | Mierley . | |
| 3,704,960 | 12/1972 | Zagar . | |
| 3,705,453 | 12/1972 | Olson | 29/281.5 |
| 3,771,927 | 11/1973 | Schiller . | |
| 4,172,310 | 10/1979 | Mincuzzi . | |
| 4,439,096 | 3/1984 | Rockwood et al. . | |
| 4,620,475 | 11/1986 | Watts | 29/888.02 |
| 4,687,412 | 8/1987 | Chamberlain | 415/173.1 |
| 5,070,589 | 12/1991 | Howell et al. | 29/464 |
| 5,142,762 | 9/1992 | Dziomy et al. . | |
| 5,149,248 | 9/1992 | Cramer | 29/889.22 |
| 5,165,160 | 11/1992 | Poncelet | 29/464 |

*Primary Examiner*—S. Thomas Hughes
*Assistant Examiner*—Tisa Stewart
*Attorney, Agent, or Firm*—Virginia B. Caress; William R. Moser; Paul A. Gottlieb

[57] ABSTRACT

An installation and assembly device for aligning a first member such as a pump impeller with a second member such as an inlet nozzle of an impeller pump. The installation and assembly device includes a sleeve slideable within the inlet nozzle and a vertical positioning assembly which has a contact member that is extendable out away from the sleeve so as to vertically position the sleeve on a shoulder of the inlet nozzle and to present an upper contact surface spaced a certain distance from the shoulder to provide the desired vertical spacing with respect to the impeller contacting the upper contact surface. The vertical positioning assembly is retractable so as to allow for removal of the sleeve through the nozzle when installation and assembly are completed. The alignment device also includes a radial alignment assembly supported by the sleeve and adjustable to an expanded state for contacting and spacing the interior surface of the impeller a certain distance from the sleeve and hence a certain distance from the inlet nozzle. The radial alignment device being adjustable from a retracted removal state to an expanded state and also being adjustable to fine tune the spacing of the impeller from the sleeve. The radial alignment device also preferably includes members that can be used to releasably secure the sleeve to the impeller.

25 Claims, 2 Drawing Sheets

INSTALLATION AND ASSEMBLY DEVICE AND METHOD OF USING

BACKGROUND OF THE INVENTION

1. Field of the Invention

The present invention relates to an installation and assembly device and method for facilitating the fitup of mating components during blind or remote installation and assembly, especially where close fitup tolerances are involved. The present invention is particularly useful for the purpose of facilitating vertical and/or radial relative positioning of a pump impeller within a mating inlet nozzle during a blind assembly wherein actual fitup cannot be observed during installation.

2. Background Discussion

The assembly of two mating components, when it is difficult to see how the two components are coming together, can be an extremely difficult and frustrating task. Such a task is made even more difficult and frustrating when close vertical and/or radial positioning tolerances are involved. The difficulty level is still further increased when care must be taken to avoid inadvertent contact between the two mating components which contact can damage the closely toleranced components.

One particular set of components that has proven particularly difficult to accurately and safely assemble is an impeller pump assembly wherein the two mating components are the pump driving assembly with impeller and the pump casing with inlet nozzle. As efficient operation of the impeller pump is closely tied in with the appropriate relative vertical and radial spacing between the impeller and the mating inlet nozzle, it is important that the required small clearance gaps be obtained with accuracy (i.e., concentric and with constant vertical spacing about the entire periphery of the impeller). Further, as efficiency can be seriously degraded by variations in the predesigned component surfaces, particular care must be taken to avoid the formation of nicks, scratches, gouges or other impeller or nozzle inlet damage during assembly. An installation and assembly device must thus be designed to avoid damage of this sort. Also, the installation and assembly device must be easy to operate and cannot involve a prolonged assembly period as very often the assembly is made during emergency situations or, even if during regular maintenance, can present unwanted downtime at a facility.

SUMMARY OF THE INVENTION

The present invention is directed at solving the above noted problems by providing a device and a method for using the device that facilitates the installation and assembly of two mating components, especially those involving blind assembly due to the particular shape of the components or the immediate environment about those components.

In facilitating the blind fitup of two mating members or parts, the present invention features an installation and assembly device which includes an alignment sleeve, a vertical positioning assembly for vertical positioning of one mating member with respect to the other, and a radial positioning assembly for the radial alignment of one member with respect to the other.

The radial positioning assembly, which is supported by the alignment sleeve, extends from an inside surface to the outside surface of the alignment sleeve and is radially adjustable with respect to the alignment sleeve. The radial positioning assembly preferably comprises a plurality of set screws that extend through the sleeve so as to have a free or abutment end external to the sleeve and an adjustment end interior to the exterior surface of the sleeve.

The vertical positioning assembly is also supported by the alignment sleeve and is radially adjustable with respect to the alignment sleeve. In a preferred embodiment, the vertical positioning assembly includes a plurality of vertical supports which extend through slots or apertures formed in the sleeve. The vertical supports are secured to the sleeve by adjustable securement devices such that the vertical supports are adjustable between an extended position wherein the peripheral edge of the vertical supports is spaced externally out away from the exterior of the alignment sleeve to a retracted position wherein the edge is less extended. The adjustable securement devices are accessible from the interior of the sleeve. The vertical supports have a contact surface designed to contact the second mating component so as to keep it vertically spaced from the other component by the desired amount until one can be fixed in position with respect to the other.

The vertical supports also have a second contact surface which, when a vertical support is extended, comes into contact with the first member such that the first contact surface is placed at the appropriate vertical position to achieve the desired vertical spacing between the two mating members. In one embodiment, the vertical supports are L-shaped sections with a horizontal leg of each section providing the first and second contact surfaces and a vertical leg of each section being positioned within the sleeve and supported by one or more adjustable securement devices which extend into contact with the sleeve. The thickness of the horizontal legs and their horizontal orientation are closely toleranced so as to achieve the desired spacing.

Also, in a preferred embodiment, a plurality of rough alignment pins that double as securement studs (or are replaceable with such studs) are provided on one member, and the opposite member has corresponding rough alignment apertures. Thus, when the desired installation and assembly of the two components are achieved, the initial alignment pins are removed or modified and fasteners on the studs fix the two components so as not to shift with respect to each other.

The present invention also features a method for installing and assembling a first contact member with respect to a second contact member. The method involves inserting an alignment sleeve, forming part of the installation and assembly device, into an aperture or recess in the second contact member. The alignment sleeve is then releasably secured to the second contact member preferably by manipulation of the radial positioning assembly. The radial positioning assembly is then adjusted such that a preferred spacing arrangement between the alignment sleeve and second contact member (e.g., radially concentric and axial parallel) is provided.

The two contact members are then brought closer together such that the alignment sleeve is inserted into a reception area of an aperture formed in the first contact member. The reception area is sized so as to be only slightly larger in cross-section than the exterior surface of the alignment sleeve. The alignment sleeve is inserted into the reception area until the vertical support assembly, which is in an extended state, comes in contact with a supporting surface of the first contact member. At this point, the second contact member is appropriately vertically spaced from the first contact member and the exterior of the second contact member is radially spaced from a reception port of the first member which has a larger cross-sectional area than the reception area of the second contact member.

In a preferred embodiment, the contact surfaces of the vertical support assembly, when in an expanded state, are placed in a position external to the exterior surface of the sleeve so as to catch on a shoulder or flange support surface formed in the first contact member. The shoulder support preferably represents a step between a large diameter reception port and a smaller diameter reception area of the first contact member. As noted, the vertical support assembly preferably includes a plurality of angle sections each having a horizontal leg with the horizontal legs' bottom and top surfaces representing the contact surfaces. The bottom surface thus contacts a supporting surface of the first member and the top surface thus forms a resting surface for the second member when placed about the sleeve. Preferably, the vertical support assembly is comprised of a plurality of equally circumferentially spaced L-shaped members with a horizontal leg and a vertical leg.

The step of securing the sleeve to the second contact member and radially positioning one with respect to the other, preferably first involves positioning a plurality of setting members such that one or more of the setting members has a free end spaced externally with respect to the external surface of the sleeve. The initial external extension of the setting members is designed to be slightly less than that of the interior circumference of the surface defining the second contact member's aperture so as to allow for insertion of the sleeve into the aperture without undesired contact while also allowing for a subsequent quick securement of the alignment sleeve and second contact member. Once the sleeve is secured in the second contact member the setting members are further expanded or retracted in a fine tuning process until the desired radial spacing is achieved. The positioning and fine tuning of the setting members includes adjusting the setting members from the interior surface of the sleeve.

It may also be possible in some situations to place the sleeve by itself into an aperture formed in the first contact member with the setting members defining a preferred circumference and then inserting the second contact member over and past the setting member's free ends. This latter technique is less preferred, however, as there is a higher risk of undesired contact during the initial stages of assembly, as compared with releasably securing the sleeve to the second member before insertion.

With careful adjustment of the setting members, the outside diameter of the alignment sleeve can be held concentric to the outside diameter of the second member (e.g., within 0.025 to 0.050 mm or 0.001 in. to 0.002 in.). Also, prior to mating the two members, the minimum inside diameter of the reception port of the first member can be measured and the outside diameter of the second member or component can be measured to determine the desired final spacing between the first and second members. The above described setting of the individual setting members is thus conducted to achieve the required circumference which will space the exterior of the second member within the interior of the reception port of the first member at the desired spacing and in a concentric arrangement.

Moreover, since the vertical supports of the vertical support assembly extend transversely to the axial center line of the sleeve and fall on a common plane, the placement of the vertical support assembly in contact with the bottom edge of the second contact member ensures that the second contact member is in a parallel relationship with the axial center line of the alignment sleeve. Also, this arrangement helps avoid contact between the sleeve and reception area of the first contact member during initial insertion.

Following placement of the vertical spacing assembly into contact with the support surface of the first contact member, an operator can reach up within the interior of the aperture in the first contact member and, with a feeler gage or the like, determine the spacing "D" between the outside diameter of the alignment sleeve and the inside diameter of the reception area in the first contact member. Knowing that the spacing which should exist between the minimum inside diameter of the reception port and outside diameter of the second mating member is directly related to the concentricity of spacing D, it can readily be confirmed whether the two mating parts have been placed in the desired position by the installation and assembly device. Any deviation in the concentricity or in the spacing can be corrected by making fine adjustments in the relative position of one contact member with respect to the other or fine positioning adjustments in both. Since it is known that any adjustment in the concentricity of the sleeve with respect to the reception area of the first contact member will create the same variation in spacing between the exterior of the second contact member and the interior of the first contact member's reception port, fine tuning adjustments can be made with confidence despite the fact that a blind fitup is involved.

The invention is particularly useful in aligning and assembling an impeller (second contact member) with respect to a mating inlet nozzle (first contact member). In this situation, the inlet nozzle has a reception port which receives the bottom of an impeller and a smaller diameter reception area positioned upstream from the reception port which receives the alignment sleeve and not the impeller bottom. The shoulder support surface is positioned between the reception port and the upstream reception area in which the sleeve is inserted. The vertical support assembly, when in its most expanded state, is designed to fit within the reception port prior to contact with the shoulder support. Following the final securement of the two components with respect to each other, the vertical support assembly and the radial positioning assembly are contracted such that the entire installation and assembly device can be slid out through the smaller diameter reception area and out away from the inlet port of the inlet nozzle.

Prior to contracting or releasing the sleeve from the radial adjustment assembly, the vertical support assembly alone can be removed and confirmatory measurements taken as to the spacing of the two mating components as access is provided through the openings formerly occupied by the vertical support assembly.

Thus, as the pump drive assembly with impeller is lowered in place with respect to the pump housing, using pump casing guide pins mounted on the pump housing for rough alignment, the installation and assembly device mounted within the impeller provides fine alignment as the alignment sleeve is guided within the inlet nozzle's smallest inside diameter so as to allow the impeller to ease into the mating inlet nozzle recess or reception port within a small (e.g., 0.025 mm–0.050 mm) clearance. Thus, the impeller does not contact the inlet nozzle during the blind installation and the impeller is centered within the reception port of the inlet nozzle.

The concentricity between the impeller outside diameter and reception port's inside diameter can then be confirmed by reaching up through the inlet nozzle and measuring the clearance between the alignment sleeve's outside diameter and the inside diameter of the inlet nozzle's reception area with a feeler gage. Knowing the assembled concentricity, the pump assembly can then be adjusted until the concentricity is within 0.015 to 0.050 mm. This confirms that the impeller bottom is centered with respect to its mating bore (i.e., the reception port) above (since the sleeve was previously adjusted to be concentric to the impeller outside diameter).

Moreover, by reaching up through the inlet nozzle, the bolted angle segments and setting screws can be retracted, and the installation and alignment sleeve removed from the pump inlet nozzle bore.

The information above identifies just one successful application of the installation and assembly alignment device for a pump. The device, however, is not solely limited to pump assembly but can be used in other cases where fitup of a sleeve inside a mating bore is required under conditions of close tolerance during a blind or remote assembly. The device is likewise not limited to circular configurations but can be used for many other shapes or configurations. Any material that can be machined and hold reasonably close tolerances can be used for the device. Also, because the sleeve position is adjusted by set screws or bolts, the concentricity can be radially biased, if required, to achieve particular alignment conditions.

BRIEF DESCRIPTION OF THE DRAWINGS

The advantageous aspects of the invention will be more fully appreciated from the following description, particularly when considered in conjunction with the attached drawings, wherein.

DETAILED DESCRIPTION OF THE PREFERRED EMBODIMENT(S)

While the installation and assembly device of the present invention is generally applicable to assembly operations in which one sleeve configuration must fit concentrically and/or with a specific spacing within a similar mating component and particularly when close tolerances are involved during a blind assembly, the following disclosure is directed at a preferred use of the present invention in the context of a blind fitup of an impeller pump assembly.

Figure 1:
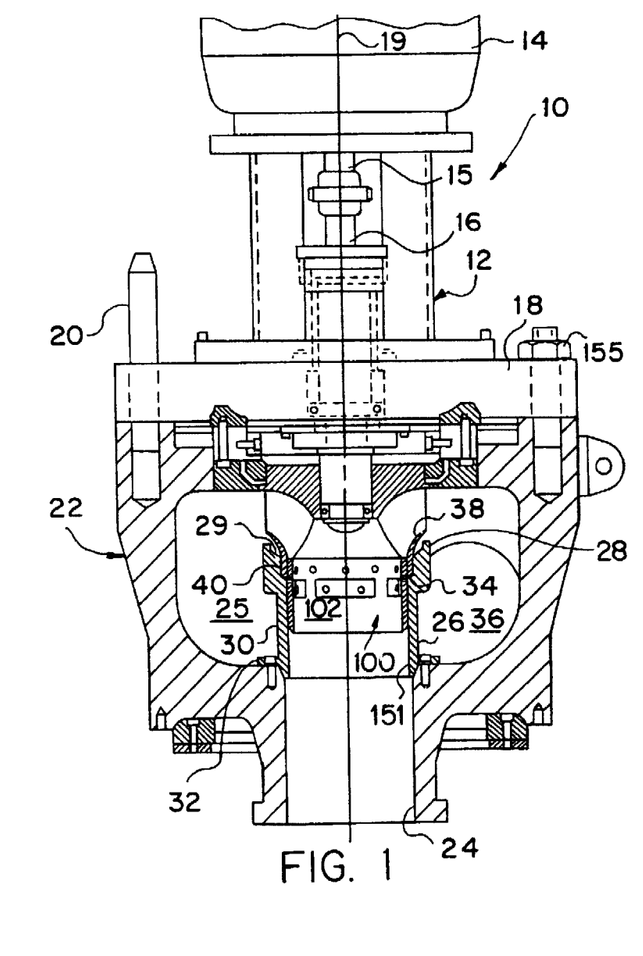
FIG. 1 illustrates an elevational view, partially in cross-section, of a pump assembly with the installation and assembly device of the present invention installed.

FIG. 1 shows an elevational view of the pump assembly 10 which is comprised of two component parts identified by pump drive assembly 12 and pump casing 22, with the latter being shown in cross-section.

Pump drive assembly 12 features motor 14 in driving communication with impeller drive shaft 16 and closure base plate 18. Closure base plate 18 is secured to pump casing 22, and closure base plate 18 and associated bearing assemblies act to maintain drive shaft 16 in vertical alignment along center line 19. Impeller 38 is secured to the bottom end of drive shaft 16 such that it is rotated upon rotation of the motor's drive shaft 15.

When pump assembly 10 is operating and fluid is flowing, impeller 38 acts to direct fluid received, through nozzle inlet port 24 and nozzle inlet sleeve 26, radially outward past the impeller 38, whereupon the fluid is compressed in fluid cavity 25 and then exits through horizontal outlet port 36.

Inlet sleeve 26 is securely mounted to the pump casing 22 in the fluid cavity 25. Inlet sleeve 26 includes sleeve base 32 which is releasably mounted to the pump casing 22 and provides support for sleeve extension 30 which is integrally joined with sleeve reception head 28. Sleeve reception head 28 has a cylindrical interior surface 29 which corresponds with the cylindrical configuration of impeller bottom 40 and is referred to as the reception port below. The interior surface (151, FIG. 4) of sleeve extension 30 is referred to as the reception area below.

Impeller bottom 40 is spaced radially inwardly from interior surface 29 of the reception head 28 with the spacing distance being designed to provide optimum performance for pump assembly 10 (e.g., a radial clearance of 0.025 to 0.050 mm). Sleeve reception head 28 further includes ring-shaped shoulder 34. Upon final positioning of impeller 38 in reception head 28 of inlet sleeve 26, the lower free edge (99, FIG. 4) of impeller bottom 40 is spaced above the horizontal shoulder 34 with adequate clearance.

FIG. 1 further illustrates rough alignment pins 20 extending from casing 22 and through rough alignment apertures formed in closure base plate 18. Preferably there are three or more rough alignment pins 20 placed just inwardly of the outer periphery of closure base plate 18 and equally circumferentially spaced with respect to each other (e.g., 3 pins spaced 120° apart).

Figure 4:
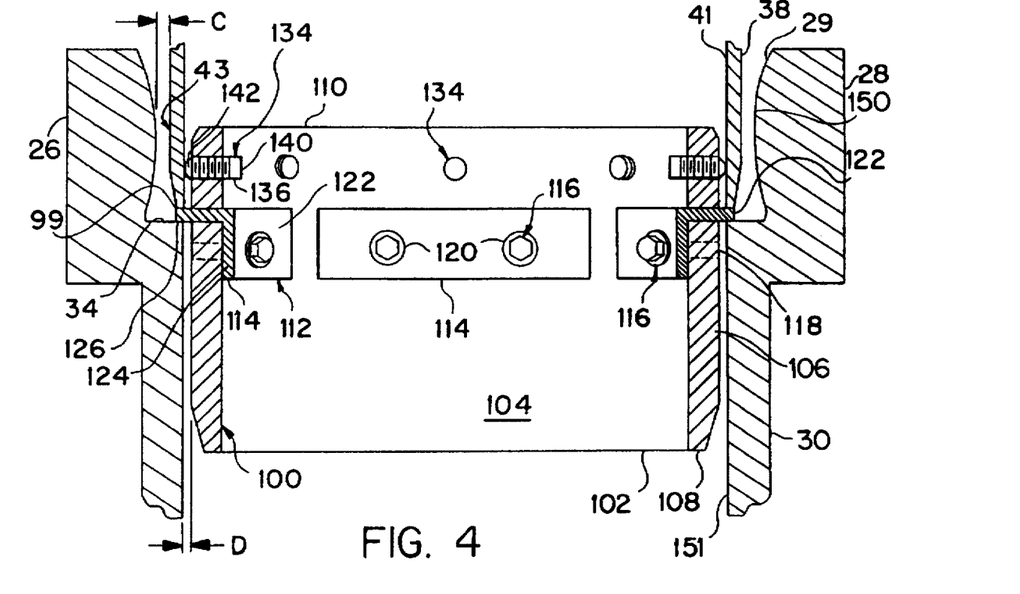
FIG. 4 shows the installation and assembly device in position with respect to the inlet sleeve of the pump assembly following final installation and prior to installation and assembly device removal.

FIG. 1 illustrates installation and assembly device 100 of the present invention supported by a first member of pump assembly 10 represented by pump casing 22. FIG. 1 also illustrates a second member of pump assembly 10, which is represented by pump driving assembly 12, in contact with installation and assembly device 100. Installation and assembly device 100 includes alignment sleeve 102 which is shown in FIG. 4 to have an exterior surface 106 having a circumference (or periphery if it has other than a circular cross-section) which is slightly less than that of the reception area defined by the interior surface of sleeve extension 30 such that installation and assembly device 100 can be vertically shifted and guided with respect to inlet sleeve 26 as well as the remainder of inlet port 24.

FIG. 1 shows installation and assembly device 100 in its final position. Also, impeller bottom 40 is shown in its final resting position in FIG. 1 between the interior surface of sleeve reception head 28 and the outer exterior surface of alignment sleeve 102 and vertically spaced above shoulder 34 defining an interior bottom surface of reception head 28.

Figure 2:
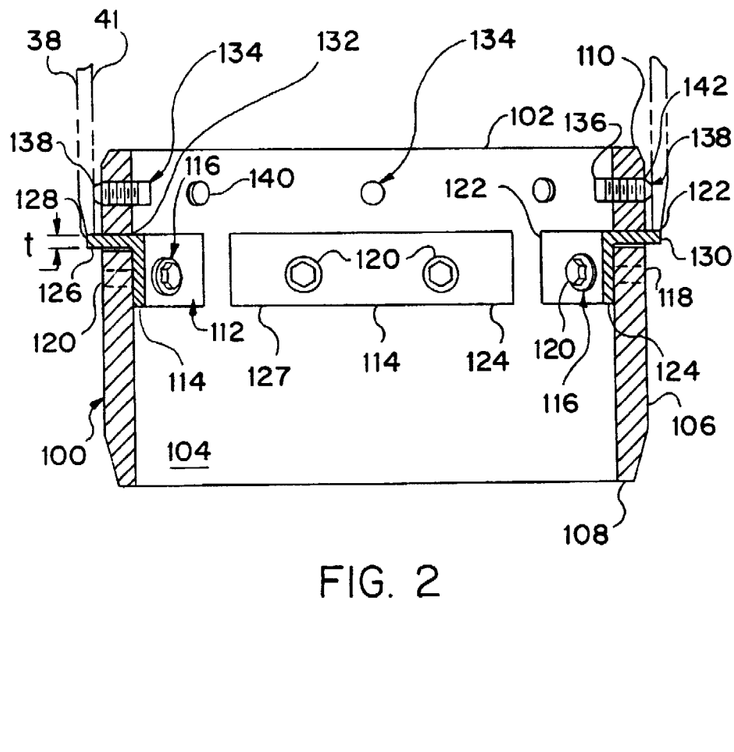
FIG. 2 shows an elevational cross-sectional view of the installation and assembly device of the present invention as well as a cutaway view of the impeller bottom (shown in dash lines) in its final resting position.
Figure 3:
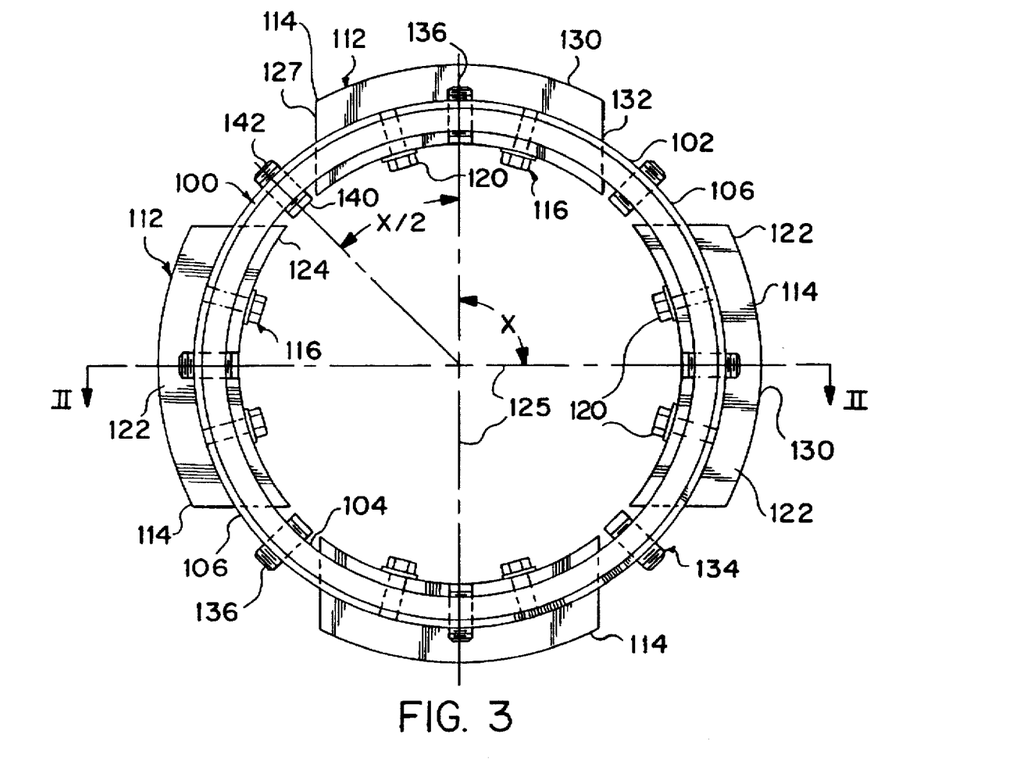
FIG. 3 shows a top plan view of the installation and assembly device of the present invention.

FIGS. 2 and 3 illustrate a preferred embodiment of the installation and assembly device of the present invention. FIG. 3 shows a top plan view of installation and assembly device 100 while FIG. 2 presents an elevational view of the cross-section taken along cross-section line II—II in FIG. 3.

As shown in these figures, device 100 includes alignment sleeve 102 which in this particular embodiment is cylindrical in shape with an outside diameter conforming with the diameter of the surface defining inlet port 24 in pump casing 22 (FIG. 1) and with the inside diameter of sleeve extension 30. Sleeve 102 has an interior surface 104, an exterior surface 106, bottom edge 108 and top edge 110. Vertical positioning assembly 112 is shown in FIG. 2 to be mounted on sleeve 102 in the upper 50% of the distance between bottom edge 108 and top edge 110.

In a preferred embodiment, vertical positioning assembly 112 is comprised of a plurality of angle sections 114 (at least two or three and more preferably four as shown in FIG. 3). FIGS. 2 and 3 show each angle section 114 adjustably secured to alignment sleeve 102 by way of adjustable securement device 116 which, in this particular embodiment, is represented by a pair of bolts 120 each passing through a non-threaded aperture in angle section 114 as well as through threaded holes 118 formed in sleeve 102. The present invention also includes within its scope the possibility of using a single ring like structure with spaced support sections and with the support sections being expandable.

FIGS. 2 and 3 illustrate that each angle section 114 includes horizontal leg 122 and vertical leg 124. Vertical leg 124 is shown in FIG. 3 to have an exterior circumference conforming to the corresponding circumferential section of the interior surface 104 of sleeve 102. FIG. 3 also reveals that angle sections 114 of vertical positioning assembly 112 are equally spaced about the circumference of sleeve 102 and thus the embodiment with four angle sections 114 has center lines 125 intersecting in an orthogonal relationship (i.e., X=90°).

FIG. 3 further reveals that the horizontal legs 122 of the vertical supports extend through corresponding slots 132 so as to position peripheral edge 130 of horizontal legs 122 radially outward from exterior surface 106 of sleeve 102 when bolts 120 are set at a maximum angle section extension position. Through-slots 132 preferably have side walls that converge in a direction from the interior surface 104 to exterior surface 106 such that when bolts 120 are in the maximum angle section extended position, the angle section's slightly less angled converging side edges 127 (FIG. 3) provide a wedge fit for greater stability.

FIG. 3 also illustrates bolts 120 being equally circumferentially spaced to opposite sides of center lines 125 and positioned essentially midway between a respective center line 125 and a corresponding side edge 127.

With reference to FIG. 2, horizontal leg 122 has lower contact surface 126 and upper contact surface 128 with the distance therebetween representing thickness "t" of leg 122. The outer peripheral edge 130 of angle sections 114 is also illustrated in FIG. 2.

Bolts 120 and the vertical supports are dimensioned and arranged such that, in the maximum horizontal leg extension position, peripheral edge 130 is external to the exterior side of alignment sleeve 102, but is well clear of the sleeve reception head's minimum inside diameter surface 150 (see FIG. 4). The peripheral edge 130 of the horizontal leg of the angle sections is positioned radial inward of surface 150 such that the extended angle sections can easily clear the inside diameter of sleeve reception head 28 when the installation and assembly device 100 and attached impeller are lowered into position until lower contact surface 126 of each angle section contacts shoulder 34 (see FIG. 4). When in a withdrawn position, peripheral edge 130 of each angle section 114 is placed essentially commensurate with exterior surface 106 or inward thereof (or even completely withdrawn from sleeve 102) such that sleeve 102 can be withdrawn out of inlet sleeve 26 and inlet port 24 for purposes described in greater detail below.

FIGS. 2 and 3 also illustrate that each bolt 120 is threaded within cylindrical sleeve 102. Bolts 120 are also preferably vertically centered on vertical legs 124.

In a preferred embodiment, upper contact surface 128 is positioned down from top edge 110 of sleeve 102 by about 20 to 30% of the total axial length of sleeve 102. About midway in the vertical or axial direction between horizontal leg 122 and top edge 110 is provided radial alignment assembly 134. A preferred embodiment of radial alignment assembly 134 is shown in FIGS. 2 and 3 to comprise a plurality of set screws 136 (3 or more preferred with 8 being especially well suited for the purposes of this invention). As shown in FIG. 2 set screws 136 are received in tapped holes 138 and are adjustable so as to be extendable out away from exterior surface 106 or retracted so as to be inward of exterior surface 106. Each adjustable set screw has an adjustment end 140 and a free or abutment end 142. The set screws, in addition to radial adjustment, provide for the temporary securement of the alignment sleeve to the inside surface 41 of the impeller bottom.

Also, as shown in FIG. 3 the set screws are equally spaced circumferentially about sleeve 102 and at least some are preferably centered above angle sections 114 (i.e., a vertical plane positioned flush with center line 125 bisects corresponding set screws 136 positioned above angle sections 114). As there are preferably more set screws 136 than angle sections 114, (e.g., twice as many set screws as angle sections) set screws are positioned circumferentially between center lines 125 (e.g., X/2 which in the embodiment of FIG. 3 is 45°).

The installation and assembly device of the present invention is well suited for assembly operations in which one sleeve configuration must fit concentrically within a similar mating component, where a constant vertical spacing between two components is important and where close tolerances are involved. The installation and alignment device is particularly well suited for assemblies wherein close spacing tolerances must be obtained despite the assembly being a blind assembly.

FIG. 4 provides a more detailed illustration of an application of the present invention with respect to the installation and assembly of impeller 38 of pump drive assembly 12 (e.g., a large pump drive assembly weighing 14,100 Kg and having an impeller diameter of about 110 cm). FIG. 4 shows, in cross-section, the installation of the bottom of the impeller 38 into the pump casing's reception head 28 in a blind assembly involving tight tolerances.

An assembly operation of this nature requires that:

(1) the pump impeller 38 not contact the interior surface of sleeve reception head 28 so as to eliminate nicks, scratches, gouges or other impeller damage;

(2) the outside diameter of impeller 38 be positioned concentric to the inside diameter of sleeve reception head 28;

(3) the bottom edge of the impeller be positioned so as to provide a specific and equal clearance space between shoulder 34 of inlet sleeve 26 and the bottom edge 99 (FIG. 4) of impeller 38;

(4) the radial clearance and concentricity be confirmed following installation by actual measurement; and (5) the installation and alignment device be removable without interfering with the positioned impeller and inlet sleeve and without damaging these components.

The installation and assembly device of the present invention achieves the follow requirements so as to greatly facilitate vertical and radial alignment fitup of a pump impeller within a mating inlet nozzle during a blind assembly where actual fitup cannot be observed during installation. The method of the present invention, with respect to the preferred use in the context of an impeller pump assembly fitup, will now be described.

A determination is made as to what the desired clearance spacing (C, FIG. 4) should be between the minimum inside diameter of surface 150 of sleeve reception head 28 and the outside diameter of exterior surface 43 of impeller 38 for maximum impeller output. In addition, a determination can be made as to the outside diameter of sleeve 102 and the inside diameter 151 of inlet sleeve extension 30 so that the proper spacing "D" value is known. The radial alignment assembly can be adjusted to be somewhat less than the inner diameter of interior surface 41 of impeller 38 so that the sleeve can be inserted without undue contact and then expanded for temporary securement of the sleeve within the impeller bottom. Fine adjustments can then be made until the lower peripheral outer surface 43 of impeller 38 is concentric and parallel to the outer surface 106 of alignment sleeve 102. As noted, the extension (or at least the final stage of extension) preferably occurs after sleeve 102 is in place within the impeller interior surface 41 to avoid undesired contact between the set screws and the impeller's surface when sleeve 102 is inserted. (A rough determination can be made as to how far the ends of the set screws are extended by monitoring the degree of rotation of marking indicia or a touch sensitive marking recess or raise on the adjustment end 140 of set screws 136.)

As discussed in greater detail below, the vertical thickness "t" of horizontal leg 122 (see FIG. 2) determines the vertical spacing between the bottom edge 99 (FIG. 4) of impeller 38 and shoulder 34 of inlet sleeve 26. Accordingly, each angle section 114 is manufactured so as to have a closely toleranced (e.g., ±0.025 mm) vertical thickness "t". Further, the underside surface of angle sections 114 and the supporting surface of the alignment sleeve's slots are machined so as to ensure that the horizontal angle sections are perpendicular to the cylindrical outer surface of alignment sleeve 102. The positioning of slots 132 within alignment sleeve 102 are also closely toleranced to ensure an equal level for each of the multiple angle sections.

The angle sections 114 are extended fully until the vertical leg contacts the alignment sleeve inside diameter where they are secured by bolts 120. The upper surface of the horizontal leg seats against the bottom edge 99 of impeller 38 when the sleeve is properly positioned within the impeller 38. This arrangement ensures that the axial center line of the impeller outer diameter 43 and the sleeve's outer diameter 106 are parallel which is important to avoid undesirable contact during insertion. Parallelism is ensured by previously machining to close tolerances the upper surface of the angle section's horizontal leg 122 and the underside of the slot 132 perpendicular to the axial center line of the sleeve. Also, the bottom edge 99 of the impeller is machined perpendicular to the impeller lower outer diameter.

The set screws 136 are adjusted against the impeller's inside diameter 41 until the installation and assembly device's outer diameter 106 is concentric with the impeller's outside diameter. The set screws also secure the device in the impeller prior to installation into the pump casing. To help confirm the placing of device 100 and the set screws into an appropriate initial position, the spacing between the inside surface of the impeller and the outside surface of sleeve 102 can be measured so as to verify a concentric arrangement and to verify the distance that the impeller bottom's outside diameter will be from the reception head's inside diameter once the impeller bottom is placed into position in the sleeve reception head 28 (the impeller bottom's thickness being known either through measurement or the manufacturer's specifications). Alternatively, the distance between the outer surface of the alignment sleeve and the radially corresponding outer surface of the impeller bottom can be measured directly to ensure correct positioning and a concentric arrangement between the sleeve and the impeller.

Prior to mating the two pump assembly parts together, the exact dimensions of the interior surface of the reception head 28 and the optimum performance spacing that the outside diameter of the impeller will need to be from the interior surface of the reception head will be known (e.g., preexisting tables or earlier testing).

Pump drive assembly 12 with downwardly extending impeller 38 and the attached alignment assembly device 100 are lowered into the inlet nozzle by suitable support and lowering means (not shown) such as a gantry crane with cable winches and human assistance. (Of course, manual labor can solely be relied upon for much smaller sized pump assemblies.) Guide pins 20 are received within alignment holes in closure base plate 18 so as to provide rough alignment. Installation and assembly device 100 provides finer alignment as the exterior surface of the impeller is centered and spaced as the lower end 108 of alignment sleeve 102 enters the inside diameter of surface 151 in sleeve extension 30. The two members are brought closer together until surface 126 of the horizontal legs 122 contact shoulder ring 34. Thus, with the assistance of the parallel relationship between the alignment sleeve and impeller the clearance between the sleeve and 151 can be maintained as well as the required clearance at C and contact is avoided between the impeller bottom and reception head's minimum inside diameter surface 150. Furthermore, the guidance provided by the interior surface 151 of inlet sleeve extension 30 helps avoid any contact in the more sensitive area between the impeller exterior surface 43 and the minimum inside diameter surface 150. In other words, even if the exterior surface of sleeve 102 was to be inserted off center so as to contact the interior surface 151, the guidance provided by the smaller diameter reception area avoids contact in the more sensitive area between the impeller exterior surface 43 and reception head minimum inside diameter surface 150. This non-contact guidance ability of the present invention is especially effective when the clearance spacing D is less than spacing C.

A check is then made as to whether the desired spacing, distance "C" (FIG. 4), is present about the entire circumference of the impeller's outside diameter and the reception head's inside diameter 150. This can be accomplished by reaching up through the inlet nozzle and measuring the clearance "D" between the outside diameter of sleeve 102 and the inside diameter defined by surface 151 with a feeler gage or the like. Measurement with a feeler gage is obtained at D. If D is concentric and the clearance is determined then the concentricity and clearance at C is confirmed. The actual spacing value for C can be determining by comparing the measurements obtained for the alignment device assembly prior to pump installation (e.g., the distance from the sleeve exterior to the impeller bottom's exterior) and the measurements for D.

Any deviations in the clearance spacing between the outer diameter of the sleeve 102 and surface 151 can be corrected through minor adjustments in the closure plate 18 bolting until the clearance spacing is at the desired distance and the two components are concentric. Any movement of sleeve 102 with respect to surface 151 to obtain a more concentric arrangement will achieve a similar result with respect to the exterior surface of the impeller bottom and surface 150 of the reception head 28 as the concentricity between the impeller bottom and upper portion of the alignment sleeve was earlier established and the concentricity between the inlet sleeve reception head 28 and its surface 151 can be measured or based on production specifications for the inlet sleeve extension 30. Also, since the sleeve 102 can be preadjusted to be concentric with the impeller outside diameter, a measured determination of the concentricity between the outside diameter of sleeve 102 and the inside diameter of the inlet sleeve extension 30 at surface 151 provides for further confirmation that the impeller is within a predefined tolerance range (e.g., 0.025 to 0.050 mm radially for the 14,100 Kg. assembly described above) with respect to the minimum inside diameter surface 150 of the reception head 28. Once it is determined that the first and second members represented by the pump drive assembly 12 and pump casing 22 are in proper position, they are fixedly secured to one another to retain that exact positioning by pump closure bolts 155 in FIG. 1.

Once the two parts are fixed in the desired position, bolts 120 are retracted until the peripheral edge 130 of each of legs 122 is inward of the inside extension 30 and inlet port 24. As the thickness "t" of the horizontal legs represents the desired vertical spacing between the two components, the withdrawal of the horizontal legs results in the desired vertical clearance being present. Retraction is accomplished by reaching up through the inlet nozzle inlet port 24 and rotating the bolts 120 with a wrench or the like. At this point, further confirmatory measurements can be obtained through the angle section slots provided once the angle sections are removed. The set screws 136 are then retracted to release sleeve 102 from the impeller and so as to allow for the installation and assembly device to be removed through sleeve extension 30 and inlet port 24.

The above described procedure has proven to be practical by actual pump drive assembly to pump easing installation where the measured concentricity was maintained within 0.025 and 0.050 mm. Furthermore, the five requirements cited above were satisfied when using the method and apparatus of the present invention.

The information above provides just one successful application of the pump installation and assembly alignment device. The device, however, is not solely limited to an impeller pump assembly like that of the preferred be embodiment, but can be used in other cases where a fitup of a sleeve inside a mating bore is required under conditions of close tolerance during a blind or remote assembly. The device is likewise not limited to a circular or cylindrical configuration but is applicable to other shapes or configurations. Any material that can be machined and which can hold reasonably close tolerances can be used for the device (e.g., plastics, hard wood, etc.). Also, because the sleeve position is adjusted by a vertical alignment device and/or a radial alignment device, a variety of fitup situations can be handled by the present invention. For example, the individual adjustability of the set screws is applicable to a situation where the axial center line of a mating component is off center with respect to the aperture in which the alignment sleeve is inserted whereby achieving a concentric arrangement between the sleeve reception head and the mating components involves placing some set screws out further than others.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. An installation and assembly device for facilitating a fitup of a first member with respect to a second member, comprising:

an alignment sleeve having an interior surface and an exterior surface;

a vertical positioning assembly, including a plurality of vertical supports which extend through apertures in said sleeve, and wherein each of said supports is an L-shaped cross-sectioned bracket with first and second legs, for vertical positioning of the second member with respect to the first member, said vertical positioning assembly being supported by said alignment sleeve, and said vertical positioning assembly being radially adjustable with respect to said alignment sleeve so as to be adapted for extension out away from one of said surfaces of said sleeve;

a radial positioning assembly for radial positioning of the second member with respect to the first member, said radial positioning assembly being supported by said sleeve and being radially adjustable with respect to said sleeve so as to be adapted for extension out away from one of said surfaces of said sleeve.

2. An installation and assembly device as recited in claim 1, wherein said plurality of vertical supports are secured to said sleeve by adjustable securement devices such that said vertical supports are adjustable between an extended position wherein a peripheral edge of said vertical supports is positioned out away from the exterior surface of said sleeve to a retracted position wherein said peripheral edge is in a less extended state, said vertical supports each having a first contact surface adapted for contact with the second member when said vertical supports are in the extended position and the second member is in position about the installation and assembly device.

3. An installation and assembly device as recited in claim 2 wherein said vertical supports each have a second contact surface adapted to contact a support portion of the first member when said vertical supports are in the extended position, and said adjustable securement devices being adjustable such that the second contact surfaces can be moved inwardly until said sleeve is telescopingly adjustable within an aperture formed in the first member.

4. An installation and assembly device as recited in claim 3 wherein said first legs extend transverse to an axial center line of said alignment sleeve and said second legs extend parallel with the axial centerline, said adjustable securement devices extend through said second legs and into a corresponding recess formed in said sleeve, and said adjustable securement devices being accessible from an internal space in said sleeve defined by said interior surface.

5. An installation and assembly device as recited in claim 3 wherein there are four of said vertical supports equally spaced about the periphery of said sleeve and with each having the first contact surface on a common horizontal plane with the axial center line of said alignment sleeve representing a vertical reference.

6. An installation and assembly device as recited in claim 2 wherein said radial positioning assembly includes a plurality of setting members that extend from the interior surface of said alignment sleeve and are adjustable with respect to the alignment sleeve so as to each have a free end positionable out away from the exterior surface of said sleeve, said setting members being spaced about the periphery of said sleeve and each being independently adjustable and accessible, said setting members being adapted to contact an internal surface of the second member when a free edge of the second member is in contact with the first contact surfaces of said vertical supports such that the second member is releasably secured to said installation and assembly device.

7. An installation and assembly device as recited in claim 6 wherein said setting members include at least four set screws arranged on a common plane above said vertical positioning assembly and threadably received by said sleeve and equally spaced about the periphery of said sleeve.

8. An installation and assembly device as recited in claim 1 wherein said radial positioning assembly includes a plurality of setting members that extend from the interior surface of said sleeve and through said sleeve perpendicular to an axial center line of said sleeve, said setting members being adjustably received by said sleeve such that a free end of each of said setting members is extendable away from the exterior surface of said sleeve and retractable to a position wherein the free end is less extended.

9. An installation and assembly device as recited in claim 8 wherein said setting members are set screws threadably received within threaded apertures formed in said sleeve at equal intervals about the periphery of the exterior surface of said sleeve, said set screws lying on a common plane which is axially spaced from said vertical positioning assembly.

10. An installation and assembly device as recited in claim 1 wherein said first member is an impeller pump inlet nozzle and said second member is an impeller pump assembly, and wherein said sleeve is dimensioned and arranged for insertion into said inlet nozzle, said vertical positioning assembly being dimensioned and arranged for fixing said sleeve in a predetermined vertical location with respect to the nozzle when said vertical positioning assembly is extended and said radial positioning assembly being dimensioned and arranged for contacting an inner surface of an impeller of said impeller pump assembly so as to releasably secure said sleeve to the impeller.

11. A method for installing and aligning a first member and a second member, comprising:

sliding an alignment sleeve into an aperture formed in the second member;

adjusting a radial positioning assembly such that said radial positioning assembly is placed in an expanded state whereby said alignment sleeve is releasably secured to the second member and said second member is spaced about a periphery of said alignment sleeve in a predetermined manner;

and inserting the alignment sleeve into said first member such that said alignment sleeve is received in a reception area in said first member, said inserting of said alignment sleeve including sliding the sleeve into the first member until a vertical support assembly supported by said sleeve contacts a contact surface presented by said first member; and determining a clearance spacing between said sleeve and the reception area of said first member.

12. A method as recited in claim 11 further comprising:

fixing the first member and second member into a fixed relative state;

and retracting one or both of said vertical support assembly and said radial positioning assembly such that said alignment sleeve is free to be withdrawn out through an extension of said reception area which extends away from an initial insertion opening of said reception area.

13. A method as recited in claim 11 further comprising providing fine adjustments in radial clearance spacing between said sleeve and said second member prior to insertion of said sleeve into said reception area.

14. A method as recited in claim 11 wherein said vertical support assembly includes a plurality of vertical supports axially spaced below said radial positioning assembly and said vertical supports each having a first contact surface for contacting the first member and a second contact surface, and said method including adjusting said vertical supports radially.

15. A method as recited in claim 11 wherein said first member is an impeller pump casing and said second member is an impeller drive assembly and sliding said alignment sleeve includes sliding the sleeve within an impeller housing.

16. An installation and assembly device for facilitating a fitup of a pump impeller within a mating nozzle inlet sleeve comprising:

an alignment sleeve dimensioned and arranged for being received within the nozzle inlet sleeve;

a vertical positioning assembly comprising a plurality of angle sections each having a vertical leg extending within said alignment sleeve and a horizontal leg extending through corresponding slots formed in said alignment sleeve;

a radial positioning assembly supported by said alignment sleeve, said radial positioning assembly being adjustable between an expanded state and a less expanded state, and said radial positioning assembly being dimensioned and arranged for contact with the impeller so as to space the impeller a certain distance away from the alignment sleeve so as to avoid contact between the nozzle inlet sleeve and impeller when the impeller and nozzle inlet sleeve are being placed in a nested arrangement.

17. An installation and assembly device as recited in claim 16 wherein said vertical positioning assembly is supported by said alignment sleeve, said vertical positioning assembly being adjustable between an expanded state and a less expanded state from within said alignment sleeve, and, when in the expanded state, providing contact surfaces for contact with the impeller and nozzle inlet sleeve so as to space the impeller vertically off from the nozzle inlet sleeve.

18. An installation and assembly device as recited in claim 17 wherein said vertical positioning assembly includes adjustable securement members adjustably fixing said angle sections to said alignment sleeve and being adjustable from a location within said alignment sleeve so as to shift said horizontal leg out away from an exterior surface of said alignment sleeve when in the expanded state and to a less extended position when in the less expanded state.

19. An installation and assembly device as recited in claim 18 wherein said radial positioning assembly includes a plurality of set screws threadably received by said alignment sleeve such that each set screw is individually adjustable from a position inside said alignment sleeve whereby a free end of said set screws is positionable at an extended position which extends out away from the exterior surface of said alignment sleeve.

20. An installation and assembly device as recited in claim 18 wherein each of said horizontal legs has a bottom contact surface and an upper contact surface-with the bottom contact surface adapted to contact a shoulder of the nozzle inlet sleeve so as to vertically position said alignment sleeve within the nozzle inlet sleeve, and the upper contact surface being positioned for contact with the impeller and said horizontal leg having a thickness between said upper and bottom contact surface which conforms with a predetermined vertical spacing between a bottom edge of the impeller and the shoulder of the nozzle inlet sleeve.

21. An installation and assembly device as recited in claim 16 wherein said radial positioning assembly includes a plurality of set screws threadably received by said alignment sleeve such that each screw is individually adjustable from a position inside said alignment sleeve whereby a free end of said set screws is positionable at an extended position which extends out away from the exterior surface of said alignment sleeve.

22. A method for facilitating a fitup of a pump impeller within a mating inlet nozzle, comprising     inserting an alignment sleeve within an aperture formed in said pump impeller;

expanding a radial positioning assembly supported by said sleeve from a less expanded state to a more expanded state such that said sleeve is releasably secured to said pump impeller;

adjusting the radial positioning assembly to obtain a predetermined spacing between said sleeve and pump impeller about a periphery of said sleeve;

inserting the pump impeller and alignment sleeve into the mating inlet nozzle until a vertical positioning assembly supported by said sleeve contacts a support surface of said mating inlet nozzle;

retracting the vertical positioning assembly; and withdrawing the alignment sleeve from the impeller and mating inlet nozzle.

23. A method as recited in claim 22 further comprising measuring a clearance spacing between said alignment sleeve and an inlet nozzle surface positioned adjacent to said sleeve prior to retracting the vertical positioning assembly to ensure a concentric arrangement between said pump impeller and said mating inlet nozzle.

24. A method as recited in claim 23 further comprising, subsequent to measuring the clearance space, shifting one of the pump impeller and mating inlet nozzle with respect to the other and then remeasuring the clearance spacing.

25. An installation and assembly device for facilitating a fitup of a pump impeller within a mating inlet nozzle during a blind assembly comprising:

an alignment sleeve having an interior surface, an exterior surface and a plurality of slots at a common vertical level and extending through said sleeve;

a plurality of angle sections slideably received within said slots, said angle sections each having a horizontal leg and a vertical leg with the horizontal leg being dimensioned so as to extend out away from the exterior surface when a corresponding vertical leg is in abutment with the interior surface of said sleeve;

adjustment screws extending through said vertical legs and threadably received by tapped holes in said sleeve such that said angle sections are adjustable internally of said sleeve between an extended position and a less extended position;

a plurality of set screws extending through threaded holes in said sleeve provided in a position vertically above said slots, said set screws having an adjustment end which is contactable from a position internally within the sleeve and a free end which is extendable out away from the exterior surface of said sleeve for contact with an interior surface of the impeller.

* * * * *